(12) United States Patent
Alfekri et al.

(10) Patent No.: US 8,686,067 B2
(45) Date of Patent: Apr. 1, 2014

(54) METHOD OF MAKING A DISPERSION OF POLYMER BINDER-ENCAPSULATED SILICA PIGMENTS AND COATED MEDIA INCLUDING SUCH DISPERSION

(75) Inventors: Dheya M. Alfekri, San Diego, CA (US); Ronald J. Selensky, Poway, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 249 days.

(21) Appl. No.: 13/264,248

(22) PCT Filed: Apr. 30, 2009

(86) PCT No.: PCT/US2009/042366
§ 371 (c)(1),
(2), (4) Date: Oct. 13, 2011

(87) PCT Pub. No.: WO2010/126517
PCT Pub. Date: Nov. 4, 2010

(65) Prior Publication Data
US 2012/0045596 A1 Feb. 23, 2012

(51) Int. Cl.
*C08K 9/10* (2006.01)
(52) U.S. Cl.
USPC ............ 523/210; 523/216; 523/319; 523/322
(58) Field of Classification Search
USPC .................................. 523/210, 216, 319, 322
See application file for complete search history.

(56) References Cited

U.S. PATENT DOCUMENTS

| | | | |
|---|---|---|---|
| 6,403,162 B1 | 6/2002 | Tokunaga et al. | |
| 6,677,389 B2 | 1/2004 | Fukuda et al. | |
| 6,783,819 B2 | 8/2004 | Deardurff et al. | |
| 6,808,769 B2 | 10/2004 | Batz-Sohn et al. | |
| 6,841,591 B2 | 1/2005 | Vincent et al. | |
| 6,905,729 B2 | 6/2005 | Wickramanayake | |
| 7,014,974 B1 | 3/2006 | Almog et al. | |
| 7,037,553 B2 | 5/2006 | Endo et al. | |
| 7,427,129 B2 | 9/2008 | Deardurff et al. | |
| 7,435,450 B2 | 10/2008 | Chen et al. | |
| 7,449,217 B2 | 11/2008 | Wickramanayake et al. | |
| 2005/0065238 A1 | 3/2005 | Lark | |
| 2005/0170109 A1* | 8/2005 | Chen et al. | 428/32.36 |
| 2007/0224345 A1 | 9/2007 | Metz et al. | |
| 2007/0227401 A1 | 10/2007 | Ganschow et al. | |
| 2007/0237911 A1 | 10/2007 | Nakano | |
| 2008/0245265 A1 | 10/2008 | Corbelli | |

FOREIGN PATENT DOCUMENTS

| | | |
|---|---|---|
| EP | 1518903 | 3/2005 |
| EP | 1894888 | 3/2008 |
| JP | 2003089757 | 3/2003 |
| JP | 2008088218 | 4/2008 |
| WO | WO 2010/038064 | 4/2010 |

OTHER PUBLICATIONS

International Search Report and Written Opinion for PCT/US2009/042366 dated Jan. 29, 2010 (13 pages).
Supplementary European Search Report for EP Application No. 09844172 dated Nov. 20, 2012 (6 pages).

* cited by examiner

*Primary Examiner* — Edward Cain

(57) ABSTRACT

The instant disclosure relates to a method of making a dispersion of polymer binder-encapsulated silica pigments for coating an ink-jet recording substrate. The method includes mixing first components of the dispersion to form a mixture, the first components including binder polymer, treating agents and a vehicle selected from the group consisting of water, a water-miscible organic solvent, and combinations thereof; shear mixing silica pigment into the mixture; and after the silica pigment is added to the mixture, shear mixing the mixture at a higher temperature and an increased grinding rate compared to a temperature and grinding rate of the shear mixing of the silica pigment into the mixture.

14 Claims, 2 Drawing Sheets

US 8,686,067 B2

METHOD OF MAKING A DISPERSION OF POLYMER BINDER-ENCAPSULATED SILICA PIGMENTS AND COATED MEDIA INCLUDING SUCH DISPERSION

BACKGROUND

The present disclosure relates generally to a method for making a dispersion of polymer binder-encapsulated silica pigments and to coated media including such a dispersion.

Ink-jet recording is performed such that droplets of ink are expelled from a printhead to the surface of a recording sheet. The droplets are adhered to the recording sheet to record images and/or characters. Ink-jet recording has many advantages including relatively high speed, low noise, and ease of multi-colored image production. Ink-jet recording has been used in a variety of fields including the production of photographic-like prints, which requires high image quality (IQ) printing. For such printing, it is generally desirable that the recording sheet be free of cracking, and be able to achieve high productivity, image quality, and gloss.

BRIEF DESCRIPTION OF THE DRAWINGS

Features and advantages of embodiments of the present disclosure will become apparent by reference to the following detailed description and drawings, in which like reference numerals correspond to similar, though not necessarily identical, components. For the sake of brevity, reference numerals or features having a previously described function may or may not be described in connection with other drawings in which they appear.

DETAILED DESCRIPTION

Disclosed herein is a coated media which includes a coating layer that exhibits enhanced gloss and gloss uniformity, better stability and a longer shelf life (both in the fluidic and coated forms) than other coatings with similar ingredients. It is believed that the binder-encapsulated silica pigment particles in the coating of the coated media advantageously contribute to such enhanced and desirable properties of the coated media.

It has been found that challenges often arise when going from preparing swellable coating technology (which generally does not include silica as the main component in the ink absorbing material) to preparing microporous coating technology (which generally does include silica as the main component in the ink absorbing material). Microporous coatings tend to enable very fast ink drying and improved gamut, especially when used with pigment inks. However, the binder used in the coating is sensitive to the amount of silica pigment used, and the silica pigment in the coating is sensitive to both ink volume and ink composition. In particular, the silica pigment tends to absorb the fluid vehicle, thereby reducing the glossiness of the coating. As such, there is often a limit as to how much silica pigment can be used without cracking the coating and/or generating a matte-like finish (i.e., reduced gloss) of the coating.

In conventional processing of silica pigment-containing pigment dispersions, the silica dispersion is prepared without the binder in the first step, and is stored for a period of time until the second step is performed. In the second step, the two parts (i.e., the silica dispersion and a binder solution) are mixed together. Specifically, the binder solution is added to the silica dispersion. Once the binder is mixed in, the final lacquer is often used within a short period of time to avoid binder separation and/or pigment settling in the lacquer.

Figure 1:
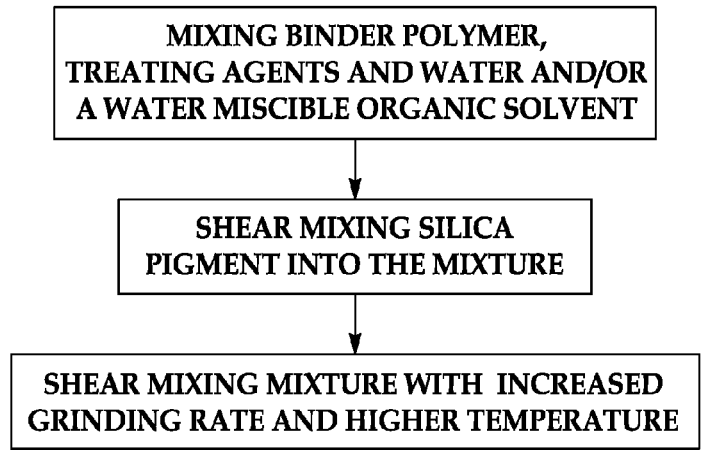
FIG. 1 is a flow diagram of an embodiment of a method for preparing an embodiment of a pigment dispersion.

Referring now to FIG. 1, a flow diagram is depicted which illustrates an embodiment of the method to prepare a pigment particle dispersion for coating an ink-jet recording substrate. The first step involves mixing a polymer binder with other treating agents and a vehicle selected from water, a water-miscible organic solvent, and mixtures of water and water-miscible organic solvent(s), before silica pigment is added. The second step involves shear mixing the silica pigment into the mixture (which already contains the binder). The third step involves shear mixing the mixture with increased grinding rate and higher temperature.

The embodiment of the method disclosed herein, as shown in FIG. 1, introduces changes in the way a silica dispersion (i.e., the binder polymer/silica dispersion) is prepared. In particular, the method disclosed herein alters the order of addition of the ingredients. Specifically, the polymer binder is added prior to any of the other ingredients. This allows more time for the polymer binder to contact the silica pigment, and interact with the silica pigment under high shear mixing. This is one advantage over previous methods, which introduced the binder as the last ingredient to the silica dispersion. As such, in such methods, no shear is applied to the final mixture of binder and silica. Rather, in such previous methods, the binder interacts with the silica pigment for a brief period under mild mixing conditions as part of the final stage of the preparation of the lacquer.

Figure 2A:
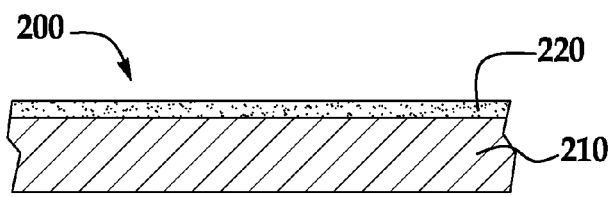
FIGS. 2A and 2B are cutaway cross-sectional views of embodiments of a coating layer after it is applied onto the surface of an ink-jet printable substrate, where FIG. 2B also shows a top layer applies with the coating layer.
Figure 2B:
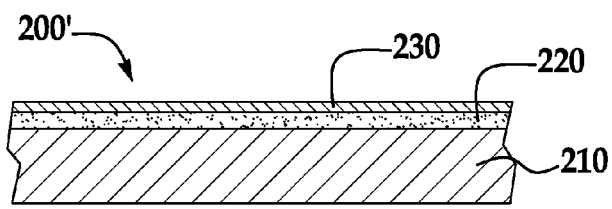

Referring now to FIGS. 2A and 2B, two different cutaway cross-sectional views of the coating layer 220 are depicted after it is applied onto the surface of an ink-jet printable substrate 210. FIG. 2A illustrates an embodiment of the coated medium 200 with the coating 220 alone established on the substrate 210, and FIG. 2B illustrates another embodiment of the coated medium 200' with an additional top layer 230 simultaneously applied with the coating layer 220, which is established on the substrate 210. The composition of the coating layer 220 is made up of at least the pigment particle dispersion (which includes polymer binder-encapsulated silica pigments, discussed further hereinbelow). The resulting coated medium 200, 200' exhibits many desirable properties, including, but not limited to, enhanced gloss and surface smoothness.

Non-limiting examples of suitable substrates 210 upon which the coating layer 220 is established include porous and non porous substrates. In particular, suitable substrates 210 include, but are not limited to paper substrates, vinyl, polyurethane, woven and non woven materials (e.g., TYVEK® from DuPont), high density polyethylene (HDPE), polyester, metals, and other like substrates. In one non-limiting example and as discussed in detail herein, the microporous coating 220 achieves higher gloss values, and thus may be used on an uncoated paper base substrate 210. This means that an expensive polyethylene (PE) layer need not be applied (e.g., by extrusion techniques) on one or both sides of the paper when such a substrate 210 is used. Such PE layers often have the undesirable side effect of inducing curl in paper substrates. This side effect usually requires the PE layer to be applied on both sides so that either no curl or a slightly negative curl will result. This adds substantially to the cost of the product.

The coating layer 220 is formed by establishing the pigment dispersion on at least one of the surfaces of the substrate 210. Non-limiting examples of methods for coating the pigment dispersion on the substrate 210 to form the coating layer 220 include air knife coating, blade coating, gate roll coating, doctor blade coating, Meyer rod coating, roller coating, reverse roller coating, gravure coating, brush coating, sprayer coating, spin coating, and other like methods. As shown in FIG. 2B, a top layer 230 is established on the coating layer 220. The top layer 230 may also be established using any suitable substrate coating technique. The top layer 230 may be applied at the same time as the coating layer 220, using, for example, a slot dye coater (e.g., via cascade coating or a co-extrusion technique). In an embodiment, the top coat 230 is another pigment particle dispersion including binder polymer, water, and alumina pigment. The coating layer 220 (and top layer 230 when included) is/are dried prior to printing on the media 200, 200'.

The pigment dispersion used to form the coating layer 220 includes the binder polymer in either pellet form, in a premixed solution with water or another water-miscible organic solvent (e.g., alcohols such as methanol, ethanol, isopropanol, and n-propanol; glycols such as ethylene glycol, diethylene glycol, and glycerin; esters such as ethyl acetate, propyl acetate, and acetone; ketones such as ethyl ketone; and any other organic solvent that is soluble in water generally not less than 10 weight %), or in a combination thereof.

Non-limiting examples of suitable polymer binders include water-soluble binders, such as binders including one or more hydroxyl groups. One example of such a binder is polyvinyl alcohol (PVA). Generally, the amount of binder present ranges from 5 to 30 wt. %, or more specifically, from 10 to 20 wt. %. Other suitable binders include, but are not limited to, polyurethane, polyacrylate, and combinations of all of the listed binders. In such combinations, the total amount of the binders present ranges from about 5 wt. % to about 20 wt. % in one embodiment or from 10 wt. % to about 30 wt. % in another embodiment, depending on the type of silica pigment particles used. These weight percentages are based on the total weight percentage of coating composition (i.e., the pigment dispersion).

The pigment dispersion used to form the coating layer 220 also includes treating agents. In an embodiment, the treating agents are selected from the group consisting of aluminum chloro hydrate, amino silane, alkoxy silane compounds, and combinations thereof. The alkoxy silane compound may be a di- or tri-alkoxy silane compound. The alkoxy silane compound functions as a catalyst in forming the complex of silica and binder polymer (discussed further hereinbelow). The alkoxy silane compound also functions as a cross linking agent for the aluminum chloro hydrate and amino silane. When a metal substrate 210 is used to form the medium 200, 200', the alkoxy silane may also function to bond the metal to the coating 220. Specific examples of the alkoxy silane compound include, but are not limited to divinyl dimethoxy silane, divinyl di-beta-methoxyethoxy silane, di(gamma-glycidoxy propyl)dimethoxy silane, vinyl triethoxy silane, vinyl tris-beta-methoxyethoxy silane, gamma-glycidoxy propyl trimethoxy silane, gamma-methacryloxypropyl trimethoxy silane, beta-(3,4-epoxycyclohexyl)ethyl trimethoxy silane, N-beta-aminoethyl-gamma-propylmethyl dimethoxy silane, NH-beta-aminoethyl-gamma-propyl trimethoxy silane, gamma-aminopropyl triethoxy silane, or the like. The total amount of each of the treating agents used generally ranges from about 0.5 wt. % to about 15 wt. % based on the total solid weight of water dispersible silica and water soluble or water dispersible binder polymer used. In one embodiment, the total amount of each of the treating agents used ranges from 1 wt. % to 19 wt. %, and in another embodiment, the total amount of each of the treating agents used ranges from 3 wt. % to 9 wt. %.

The pigment dispersion may also include other desirable additives. In an embodiment, any of the following additives, used alone or in any desirable combination, may also be included in the composition of the coating layer 220: biocides, wetting agents (e.g., SILWET® L-7600 or other suitable surfactants), humectants (e.g., glycerol), crosslinking agents (e.g., boric acid in an amount ranging from 1 wt. % to 5 wt. % or from 2 wt. % to 3 wt. %), pH adjustment additives (e.g., acetic acid), ultraviolet (UV) absorbers (e.g., TINUVIN® or hindered amines).

Still further, the pigment dispersion used to form the coating layer 220 includes the silica pigment. Non-limiting examples of suitable silica pigments include commercially available CAB-O-SIL® M-5 (from Cabot Corp.), CAB-O-SIL® M S-55 (from Cabot Corp.), Orisil 150, 200, or 250 (from Orisil, Ltd.), or other like silica pigment. The amount of silica pigments present in the dispersion generally ranges from about 3 wt. % to about 20 wt. % of the total dispersion weight. In another embodiment, the amount of silica pigments present in the dispersion generally ranges from about 5 wt. % to about 15 wt. % of the total dispersion weight.

In an embodiment of the method of forming the pigment dispersion, the polymer binder, the treating agents, and water (i.e., the first components) are mixed into a single mixing vessel. After mixing the first components at a predetermined rate at a predetermined temperature, the silica pigment is shear mixed into the mixing vessel including the mixture of the first components. During the addition of the silica pigment, shear mixing is accomplished at another predetermined rate and temperature. Once the desirable amount of silica pigment is added, the shear mixing rate and temperature is increased until the desirable pigment particle dispersion is formed in the mixing vessel. Suitable rates and temperatures are discussed further hereinbelow.

Figure 3:
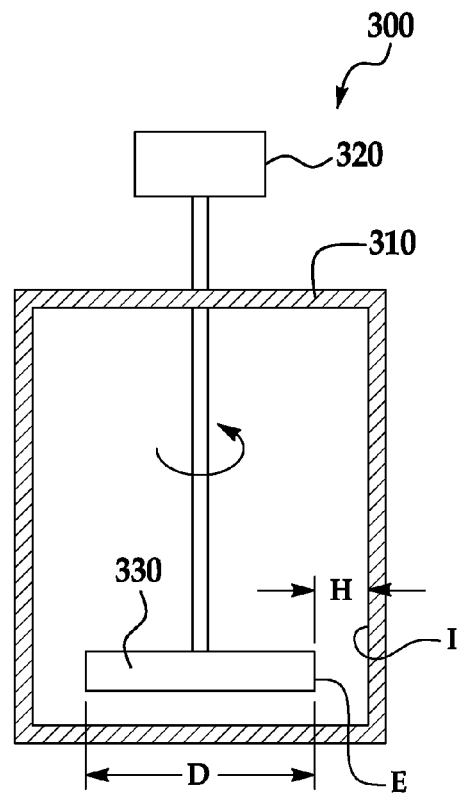
FIG. 3 is schematic cross-sectional view of a shear processing apparatus used to form an embodiment of the pigment dispersion.

A schematic cross-sectional view of the mixing vessel 310 is depicted in FIG. 3. In an embodiment, a shear processing apparatus 300 used to form the pigment dispersion includes the single vessel 310, a motor 320, a stirring disc 330 having a suitable diameter D (often measured in meters) such that a desirable distance H is present between an edge E of the disc 330 and the interior I of the vessel 310. The distance H is representative of the shear gap.

The shear rate (V) can generally be determined using the following formula:

$$\text{Shear rate}(V) = (\text{flow speed})/(\text{thickness of shear gap})$$

The shear rate (V) in a shear processing apparatus 300, such as that schematically represented in FIG. 3, may be calculated as follows:

$$V(s^{-1}) = (\pi \times D \times N)/(60 \times H)$$

where N=level of stirring in rpm; and D=stirring disc diameter in meters.

In the embodiment of the method disclosed herein, at least the grinding rate (also referred to herein as the shear rate) increases as more components are added to the mixture. In some instances, the temperature is also increased. The first components (i.e., the polymer binder, the water, and any treating agents) are mixed at a grinding rate ranging from 10 to 60 Hz and at a temperature ranging from 20 to 40° C. In a non-limiting example, the first components are mixed at a grinding rate ranging from 10 to 20 Hz and at a temperature ranging from 35 to 40° C. When mixing the silica pigment into the first components mixture, the grinding rate is increased and ranges from 20 to 60 Hz and the temperature is maintained within the range from 20 to 40° C. In a non-limiting example, the silica pigment is shear mixed into the first component mixture at a grinding rate ranging from 30 to 60 Hz and at a temperature ranging from 35 to 40° C. After all of the desired silica pigment is added, the mixture is shear mixed at a grinding rate ranging from 20 to 60 Hz and at a temperature ranging from 30° to 90° C. Generally, the shear rate and temperature is increased after all of the silica pigment is added. In a non-limiting example, after all of the silica pigment is added to the first components mixture, the mixture is shear mixed at a grinding rate of 55 to 60 Hz and at a temperature ranging from 60 to 80° C.

It is to be understood that the preparation of the dispersion may be either a continuous process or a batch process, in which the polymer binder is added prior to the silica pigment. It has been found that by adding the binder first, the coalescence of the silica in the coating 220 is decreased. As such, it is believed that, in some instances of the method disclosed herein, more binder may be used to improve adhesion qualities of the coating 220, while maintaining the overall image quality of the coating 220. Since the increased interaction between the binder and silica reduces the coalescence of the silica in the coating 220, it is believed that, the coat weight of the coating 220 may also be decreased, while maintaining the overall image quality of the coating 220. As such, the total content/amount of the binder relative to the total solids in the dispersion may be increased while still reducing the overall coat weight thickness of the final coating 220. In instances in which the coat weight thickness of the coating 220 is reduced, such a reduction will reduce the cost of the process (and thus the resulting medium), and will also increase the line speed of the process. Overall, the order of the steps of the method disclosed herein enables more flexibility in the amount of binder that may be used.

This is in sharp contrast to dispersions that are mixed according to the conventional process (i.e., the binder polymer is added to the silica pigments as the last, or near the last, step of the mixing process). These conventional processes require a strict balance in the pigment/binder ratio. Increasing the amount of binder can induce severe coalescence of the silica particles, which is not desirable in ink-jet printing.

Furthermore, the order of the method steps disclosed herein is believed to contribute to the final rheology of the finished dispersed lacquer (i.e., the pigment dispersion). For example, the pigment dispersion disclosed herein has a slightly lower viscosity than the lacquer mixed with the conventional process. Generally, the viscosity of the instant pigment dispersion is about 20 cps lower than the dispersion mixed with the conventional process. As one example, the viscosity of the instant pigment dispersion is about 130 cps while the viscosity of the dispersion mixed with the conventional process is about 150 cps. This may be beneficial in optimizing the application of the coating 220 on the substrate 210. For example, the lower viscosity of the pigment dispersion disclosed herein may enable the dispersion to be applied at a faster rate than more viscous dispersions, and to be deposited in a cleaner manner than more viscous dispersions.

As discussed above, the method disclosed herein is essentially a one step process because all of the components are mixed (substantially sequentially, with the binder being first) into a single mixing vessel 330. Dual treatments (of the binder and of the silica) are completed in a single vessel 330. One major disadvantage of the conventional microporous coating mixture preparation is that it requires a two step process. In such conventional processes, the first step involves the preparation of the silica dispersion using silica pigments and other additives in water. As part of this step, filtration and particle size optimization measures are performed. The second step involves the preparation of the final lacquer by adding the binder to the dispersion made in the first step. Prior to its introduction, the binder is first prepared in a separate vessel from the dispersion mixing vessel, and thus the silica dispersion is stored until the binder is ready. It is very time consuming to first mix the silica dispersion, store it, and then mix the binder with the silica dispersion. This two step process requires extra equipment (and thus extra cost), extra time for cleaning, extra preparation of the two (or more) mixing vessels, and the extra step of adding one of the mixtures to the other mixture. As such, using the embodiment of the method disclosed herein advantageously reduces the cost, the time, the number of steps, and the amount equipment used to manufacture a superior coating 220.

As such, it follows that one of the primary advantages of the process of the instant disclosure is that it includes a single step and a single vessel 310. This single step includes adding the binder to the vessel first and then adding the silica to the same vessel (thus enabling multiple treatments to occur in the vessel). With this process, it is believed that the manufacturing time is reduced by at least 50%. For example, in the conventional processing (involving two or three different mixture prepping steps), for one particular batch size (ranging from about 2,000 to about 4,000 kg), it may take up to as many as nine hours to accomplish the two to three mixing steps (i.e., prep of the silica dispersion, prep of the binder mixture, and mixing of the two) and to finish the conversion of the individual mixtures to form the pigment dispersion. For a similar batch size using the method disclosed herein, it is believed that the time may be up to about four hours.

Furthermore, depending on the materials used in the mixing step, this conventional process may have variability issues, which the present inventors have found is due, at least in part, to the silica mixing step occurring before binder is added. Such problems can induce larger particle sizes and can have other undesirable effects, such as cracking in the coating, with resultant poor image quality.

Furthermore, it has been found that in conventional microporous dispersion mixtures, there is difficulty in reproducing the same particle size distribution of the silica every time the dispersion is mixed. This introduces batch to batch variability problems because the silica particles and their orientation are not controlled by the binder encapsulation (as is the case with the method disclosed herein). This variability factor is overcome by the methods of the instant disclosure. With the presence of the binder in the initial mixture as required by the embodiments of the method disclosed herein, the silica pigment particle size distribution becomes more consistent and uniform. It has been observed that the binder acts as a stabilizer for the silica by encapsulating the silica. In other words, the silica depends on the binder to limit the size and shape of the silica particles in the coating 220. As long as the same binder is used in a subsequent process, the dispersion produced by the process of the instant disclosure will be reproducible from batch to batch. The reproducibility has been shown with dispersions made from lab scale, to pilot scale, to mini production scale. With the method of the instant disclosure, the formation of a stable, compatible mixture of silica, binder and other ingredients is achievable. Without the compatibility (e.g., binder stabilization and encapsulation of the silica) of silica and binder in the dispersion that is shown as a result of the process disclosed herein, which is often the case with the conventional method, the pigment settles and the dispersion essentially becomes useless for future use.

It has been found that in the embodiments disclosed herein, the grade of the binder used does not deleteriously affect the binder/silica interaction or the dispersion stability or shelf life properties of the coating 220 discussed herein. This is believed to be true regardless of whether a binder is used alone or in combinations with other binders in various batches of the pigment dispersion formed via the method disclosed herein. As such, using the method disclosed herein, one batch including a binder of a first grade and another batch including the same binder of a lower grade than the grade of the binder used in the first batch are believed to exhibit similar dispersion stability and shelf life properties. This would not be possible in coating compositions prepared according to the conventional methods. Adding a lower grade binder in the conventional method would cause the viscosity of the dispersion to increase even more than the viscosity rise observed in a similar coating made with a higher grade binder. One reason for this viscosity increase is believed to be because effective hydrolysis of the amino silane additive does not take place in the conventional method. Thus, using the conventional method, there would be little chance of achieving consistency between batches with different binder grades because of the resultant amino silane variations.

Another advantage observed with the method of the instant disclosure is the stabilization of the pigment dispersion, which prevents a high increase in the viscosity. It has been shown that by using the conventional method (i.e., silica before binder) that the pigment dispersion viscosity continues to rise due, at least in part, to the inability of the amino silane additive to hydrolyze. In sharp contrast, in the embodiments of the method of the instant disclosure, the effect of the binder hydroxyl group (e.g., present in PVA-based binders or others) is to induce the hydrolysis of the amino silane additive and stabilize the viscosity for long periods of time and under high temperature condition (such as, e.g., up to 60° C.). In the conventional method, the amino silane is not capable of hydrolysis because of the high solid content that is present in the dispersion. If the amino silane is not hydrolyzed enough, as would be the case in the conventional method, the reaction of the amino silane with the silica surface will be prohibited, thereby causing a high and sudden jump in the dispersion viscosity. Under such conditions, the viscosity of the silica dispersion will rise to a very high value, e.g. 500-3000 cps, which renders the dispersion useless, because at such viscosity levels, it cannot be mixed with the binder in the second step to produce the final lacquer. The embodiments of the process disclosed herein circumvent such increases in viscosity by enabling the binder to induce amino silane hydrolysis prior to silica introduction.

Another disadvantage with the conventional process is that the resulting dispersions are very sensitive to higher temperatures. For example, at 50° to 60° C., pigment aggregation and inferior dispersion results tend to occur.

In contrast, in an embodiment in which the method of the instant disclosure is used to form the coating 220, conversion to the pigment dispersion is achieved much more quickly, and thus pigment aggregation is reduced even when the mixture is exposed to higher temperatures (e.g., from about 60° C. to about 90° C.). In the method of the instant disclosure, silica conversion is achieved during heating (to a temperature ranging from 30 to 90° C.) after all of the silica is added to the binder/water or water-miscible organic solvent mixture. In a further embodiment, the conversion temperature in the instant disclosure ranges from 60 to 80° C. or from 60 to 90° C.

Still another disadvantage of the conventional method is the very short shelf life of the silica dispersion without the binder. When the binder is finally added to the dispersion to form the final lacquer, the final lacquer can be used for days or hours rather than months. This is because both the dispersion and the lacquer of the conventional method have very short shelf lives.

In contrast, with the dispersion formed via the process of the instant disclosure, the resulting lacquer mixture has a very long shelf life due to the effect of processing the binder in situ. The mixture formed by binder addition and then silica addition such that the materials co-exist has an improved shelf life by a factor of a hundred fold over a conventional silica dispersion in which a binder mixture is added to the silica after both mixtures have been subjected to initial and separate processing.

Furthermore, the silica dispersion produced by the conventional method has more limitations related to the timing of the shear mixing of the final coating. The shear mixing must occur within 10 hours after the ingredients of the coating mixture are first mixed together. It is believed that shear mixing should occur within this time frame because the viscosity begins to rise, and this is generally undesirable. Furthermore, under such conditions, the whole coating process must occur within a 24 hour period. If the final dispersion sits for more than 24 hours without being coated onto a substrate, the resulting coating will have a diminished void volume. As such, one of the resulting problems in the medium coated with the dispersion will be the failure of the coating to effectively absorb ink during the ink drying process due to the diminished ink void volume in the coating. It is therefore well demonstrated that the conventional method does not produce a silica dispersion with good shelf life and long-term stability.

In contrast, the increased exposure of the binder to the silica in the method of the instant disclosure contributes to achieving a coating having a much-improved shelf life and stability. The dispersion disclosed herein can reasonably withstand at least 12 months of storage, which is far different than the coating formed via the conventional process which has practically no long-term stability.

As discussed herein, the coating formed via the convention method suffers from decreased gloss in addition to other deleterious properties. One way to address the problem of decreased gloss in the coating of the conventional process has been to apply a thin top coat layer with a different formulation than the first silica/binder coating. When such a second layer is used on top of the main silica/binder coating, and the top layer includes alumina in place of or in addition to silica, some (but not all) of the qualities of the coating, such as gloss, improve.

In relation to this, it has been found that gloss of the coating 220 can be especially, even synergistically, enhanced when a second thin coating layer 230 including alumina is applied to the coating layer 220 made according to the method disclosed herein. In an embodiment when 0.5 gsm or less of an alumina-containing top layer 230, is simultaneously applied with the coating layer 220 (prepared according to the method of the instant disclosure), the surface of the overall coating 220, 230 is smoother and adds even more gloss. Glossiness is a significant and desirable attribute of coated ink-jet receptive media, especially with photographic printing.

An additional reason that the new process of the instant disclosure produces better gloss is that it results in silica particles having evenly distributed charges on the surfaces thereof, which renders the binder/silica combination in the coating 220 highly activated. This is due, at least in part, to the silica pigment being encapsulation by the binder. More specifically, the active OH groups on the surface of the binder cross link with the silica pigment, thereby encapsulating the pigments. As a result of this encapsulation, the coating 220 shows a smoother surface and more gloss even without the top layer 230. The top layer 230 simply serves to further enhance this gloss.

The encapsulation of silica with binder in the process disclosed herein results in smaller, but relatively denser, binder encapsulated particles, which are believed to have a larger surface area than particles in the distribution formed via the conventional method. The high surface area, binder-encapsulated silica particles also have more evenly distributed charges at the surface, which enables more binder-silica pigment binding affinity. Such conclusions pertaining to the dispersion disclosed herein are supported by two tests, the zeta potential test and the LUMiSizer® test. The dispersion disclosed herein (as compared to the dispersion formed via the conventional method) exhibits both a lower zeta potential and a faster rate of sedimentation. The LUMiSizer® test relates to the measurement of the size and density of silica particles. As measured by the LUMiSizer®, the dispersion particles prepared according to the methods disclosed herein are finer (having an average diameter ranging from about 120 nm to about 140 nm after aging) and are believed to have a larger surface area than particles prepared by the conventional method.

While the examples herein illustrate the relatively small particle sizes, it is believed that any size silica particle may be used in the methods disclosed herein. In a non-limiting example, the average diameter of the silica particle ranges from about 120 nm to about 180 nm. In some instances, the silica particle size may be as large as a few microns in diameter.

The result of the method disclosed herein is that the silica particles are encapsulated with the binder quicker and more effectively. This leads to more stable dispersions and longer shelf life as is shown in the examples hereinbelow. The encapsulation of silica by binder is also believed to prevent the silica from agglomerating, either due to the fact that the charges are more evenly distributed or that the charges are adequate to enable the particles to be suspended in the dispersion. In relation to this, it has been observed that zeta potential for the dispersion of the instant disclosure (e.g., ranging from about 25 to about 34) is predominantly lower than for the dispersion produced by the conventional method.

Another disadvantage of the conventional method is the narrowness of the effective high shear range (i.e., grinding rate range) which can be used to mix the coating dispersion, e.g., from $5 \times 10^3$ to $5 \times 10^5 (s^{-1})$ in typical cases. When the shear is too low, pigment aggregation results, and when the shear is too high, void volume reduction results. The method of the instant disclosure does not have such limitations on shear. Thus, a significantly broader range of shear for mixing the binder alone and then with the silica pigment is possible. As a result of this broader shear range, the final mixing step, which is performed at a high temperature and an increased grind rate after all the ingredients (including binder and then the silica pigment) have been added together, can be achieved more easily, economically and effectively. Furthermore, significantly better conversion of the binder/silica/reagent combination to the pigment particle dispersion coating is achieved using the embodiment disclosed herein.

Furthermore, it is important to note that high shear mixing is used only in the first step in the conventional process for making the silica dispersion. No shear is applied when and after the binder is added to and mixed with the silica dispersion.

In the method of the instant disclosure, the advantageous effects of the shear value/rate and mixing speed on the quality of the microporous silica coatings 220, specifically, e.g., dry-fast quality improvements and decrease in coating 220 defects (e.g., cracking), have been shown. It has also been shown (see the examples) that these effects include the stability and sensitivity of the silica dispersion mixture shelf life that is otherwise a problem in the conventional method.

The methods of the instant disclosure significantly increase the exposure of the binder to the silica so that the binder can be activated. For example, the high shear mixing of the combination of the silica and the binder together leads to the annealing of the surfaces of the binder polymer. In turn, the annealed binder surfaces produce more gloss. This gives a smoother coating 220, with less friction and better printing reliability in the printer as compared to the conventional coatings.

As detailed above, the binder in the method of the instant disclosure is in the dispersion from the beginning of the method, and thus is able to make a significant contribution to consistent particle size distribution. The greatly increased exposure of the binder to the silica, which is a direct result of the process of the instant disclosure, substantially prevents the formation of large particles or agglomerates. Such large particle or agglomerate formation often occurs in the conventional process, and the resulting particles/agglomerate can plug filters during processing. Reducing filter changes reduces manufacturing costs by improving manufacturing yields and efficiencies and reducing the number of filter elements used.

Filtration may be used in the method disclosed herein at the end of the process, i.e., after the final mixing of the silica pigments with the other components.

It has been shown experimentally that the process of the instant disclosure can be extended and easily adapted to many kinds of silica pigment dispersion mixes for surface treatment of media substrates 210. It has also been shown that the coating 220 made by the process disclosed herein can be applied on other non-silica-containing pigment lacquers mixed for the purpose of supplying a coating 220 for a substrate 210, paper or synthetic substrate for inkjet printing.

With the process of the instant disclosure, there are at least two advantageous chemistries that can be used to explain the outstanding shelf life stability, physical properties and image qualities (IQ) of the resulting dispersions. First, the binder is ground and treated under the same conditions as the silica pigment. Specifically, this process results in converting the OH groups of the exposed surface of the binder to cross link with the silica surface, thereby encapsulating the silica to form substantially evenly distributed positive charges on the surface that is essential for the stabilization of the dispersion lacquer, including the binder. The binder and silica treated together contribute to the total effective charge of the dispersion and its stability. Second, with the method of the instant disclosure, the binder is acting as the encapsulating polymer for the pigments, thus providing more stability to the pigments. Hence more evenly distributed, controlled, and balanced positive charges result. Encapsulation of silica also reduces the repulsive force that may lead to agglomeration of pigments.

Embodiments of the method disclosed herein treat the binder and the silica surfaces in one step and in one mixing vessel 310. It has been observed that this process improves most of the image attributes and physical properties of the resulting coated media 200, 200'. In addition to the improved image properties, the process reduces the time of mixing involved with pigment dispersion lacquer preparation. This in turn contributes to saving on mixing and inventory costs and increasing the shelf life in comparison to the standard mixing procedure.

As mentioned hereinabove, the pigment dispersion of the instant disclosure is established to form the coating layer 220 on the substrate 210. This coating layer 220 (and thus the media 200, 200') can then serve as an appropriate surface for printing by any suitable ink-jet printing technique, including thermal ink-jet printing, piezoelectric ink-jet printing, continuous ink-jet printing, etc.

To further illustrate embodiment(s) of the present disclosure, various examples are given herein. It is to be understood that these are provided for illustrative purposes and are not to be construed as limiting the scope of the disclosed embodiment(s).

EXAMPLES

Example 1

About 4 wt. % (of total dispersion formulation) of polyvinyl alcohol binder (POVAL® 235, Kuraray America, Inc.) was added to a mixing vessel with water to form a solution. (As mentioned above, the binder can be in the form of pellets or a premixed solution.) The treating agents used were aluminum chlorohydrate (about 3 wt. % of total dispersion formulation, with pH lowered to the acidic range) and amino silane (about 9 wt. % of total dispersion formulation, with pH elevated to moderate basic range). Other additives, including 1.5 wt. % glycerol, 2.25 wt. % boric acid, 0.75 wt. % acetic acid, and 0.75 wt. % SILWET® L-7600 were added with the treating agents. At this stage, the binder, additives/agents and water underwent shear mixing using the grinder 310 (Ystral® mixer) at lower power, 10 to 20 Hz. Substantially immediately after completing the addition of the additives, the silica pigment (about 14 wt. % of the total dispersion formulation) was then introduced or inducted at a higher shear and grinding rate. The silica was mixed in using the Ystral® mixer 310 at a power ranging from 30 to 60 Hz. The temperature was maintained at 40° C. or slightly below. Once the addition of all of the silica was complete, the overall mixture was subjected to grinding at full power (i.e., 60 Hz) with the temperature ranging from 60 to 80° C. to complete the dispersion and convert the silica so that the active OH groups on the surface of the binder cross link with the silica.

Example 2

A photographic paper substrate was coated with a silica dispersion composition made by the method described in Example 1. As a comparison, another photographic paper substrate was coated with a silica dispersion composition made by a conventional method in which the polyvinyl alcohol polymer binder was added at the end of the mixing process. A comparison was made of various physical and print image quality (IQ) characteristics in the two separate coated media. The results of the comparison were tabulated in Table 1 shown below:

TABLE 1

| Properties | Method Disclosed Herein | Conventional Method | Comments | Procedure |
|---|---|---|---|---|
| Physical Properties | | | | |
| Curl | More negative (5-15 mm)* | Mostly positive (5-20 mm) | Negative curl is preferred | Flat sheet conditioned and risen corner height is measured |
| Gloss (20° gloss) | Higher than conventional method coating by about 4-6 points** (this example measurement = 14.2) | Less glossy (this example measurement = 10.4) | Depends on substrate, difference could be up to 10 points | Gloss meter, reflection of mirror surface |
| Brightness | Comparable to conventional method | 91 | | spectrophotometer |
| Opacity | Comparable to conventional method | 91.2 | | spectrophotometer |
| Whiteness | Higher by 1 point | Lower | | spectrophotometer |
| Color (L a b) | Comparable, but with less blue hue | More blue hue | | spectrophotometer |
| Smoothness | Smoother | Less smooth | | Roughness meter, how much forced air is penetrated thru media surface |
| Particle Size | Measurements taken were 122 nm, 117 nm, and 128 nm | Measurements taken were 144 nm, 138 nm, and 141 nm | | Measured, with a particle size analyzer, after all ingredients added to mixer |
| Friction | Slightly higher (this example measurement = 0.55) | Less friction (this example measurement = 0.44) | Significant effect on sheet feeding improvement | How much resistance to slippage |
| Stiffness | Less stiff (this example measurement = 21.87) | A little more stiff (this example measurement = 22.08) | | Stiffness meter, bending resistant |
| IQ Properties | | | | |
| Gamut | Higher than or equivalent to coating of conventional method (this example measurement = 1698) | Equal or slightly lower (this example measurement = 1680) | | Color space |

TABLE 1-continued

| Properties | Method Disclosed Herein | Conventional Method | Comments | Procedure |
|---|---|---|---|---|
| Black gloss | Imaged gloss is higher by 2-3 points (this example measurement = 1 0.2) | Lower (this example measurement = 8.9) | Depends on printer and ink | Reflection of light |
| KOD | Comparable | Comparable | | |
| Bleed | Less bleeding | More bleeding | Method disclosed herein helps reduce bleeding | Colors running into each other |
| Wet smudge | Better by 1 point (this example measurement = 4) | Worse (this example measurement = 3) | Scale = 1-5, where 1 is worst and 5 is best | Water resistant |
| Dry to touch | Equivalent | Equivalent | | Rub resistant |
| Coalescence | Less coalescence (this example measurement = 0.65) | More coalescence (this example measurement = 0.70) | | Wetting of ink on surface or mottling |
| Zeta Potential | Less zeta potential (this example measurement (based on an average of several (about 30) measurements) = 25-34) | More zeta potential (this example measurement (based on an average of several (about 30) measurements) = 32-47) | Reduced zeta potential was unexpected | Amount of positive electric charge on surface particle |

*Negative 5-15 mm is a suitable range for curl; the media tested was within this range
**Points = gloss value on scale of 20-39 point integer value, where 20 is low gloss and 39 is high gloss (gloss scale may be varied, depending, at least in part, on angle at which gloss is measured)

Example 3

Figure 4:
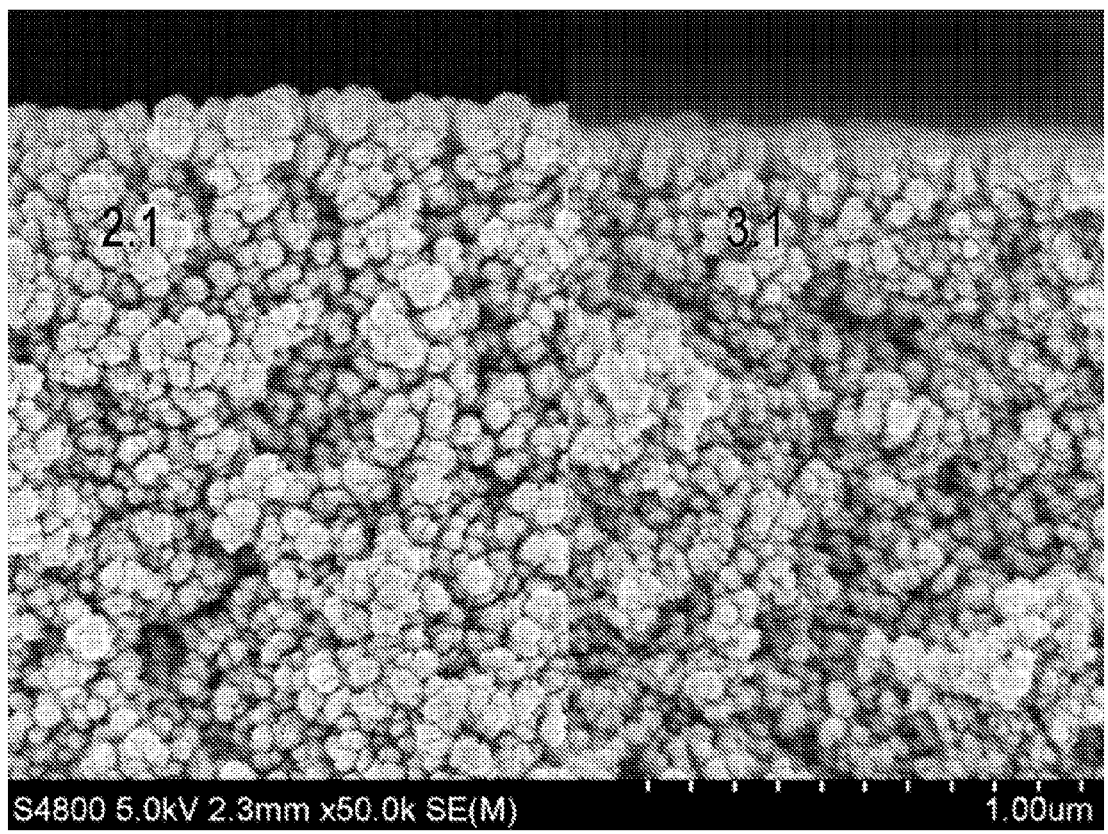
FIG. 4 is a side by side comparison of two SEM micrographs, one of which is of a conventional pigment dispersion (labeled 2.1) and the other of which is of an embodiment of the pigment dispersion disclosed herein (labeled 3.1).

Scanning Electron Micrographs (SEM) were obtained showing silica coatings for the two sample media surfaces formed in Example 2. One silica coating (labeled 2.1 in FIG. 4) was prepared by the conventional method with binder being added last with gentle mixing to the silica dispersion. The other silica coating (labeled 3.1 in FIG. 4)) was prepared by the method of the instant disclosure with the binder polymer being added first with the other additives after which the silica is added by being shear mixed into the mixture. FIG. 4 shows a side by side comparison of the SEM of the 2.1 comparative sample and the 3.1 sample. The SEM for 3.1 shows larger voids than the SEM for 2.1. The void size variation can be explained by the encapsulation process of the method of the instant disclosure generating particles with consistent diameters. Thus, the particles are oriented tangently to each other, which accounts for the increased number of voids that occur in the lattice of the 3.1 sample. The present inventors estimate that such structural differences may account for at least some of the physical and image quality differences observed with the coatings prepared with the method of the instant disclosure. Such structural differences and image quality differences include higher gloss and less ink bleed.

Example 4

Comparative samples of several conventional dispersions as well as a dispersion prepared by the method of the instant disclosure and a dispersion partially prepared by the method of the instant disclosure were prepared. Dispersions L-I through L-IV were prepared by the conventional method with specific variants of the method indicated in the last column on the right of Tables 4A and 4B. Dispersion DAB-ctrl was prepared according to the method described in Example 1 with 100% of the total binder being added during the initial step of the coating preparation process. Dispersion pseudo DAB-L was prepared partially according to the method of Example 1, with the exception that only 20% of the total binder amount from Examples 1 was added. The reduced amount of binder in the pseudo DAB-L was added during the initial step of the coating preparation process.

Table 4A below shows data, including viscosity, at a given date (Feb. 11, 2009) before the samples had been aged at elevated temperature. Table 4B shows data, including viscosity, at a subsequent date (Feb. 20, 2009) after the samples had been aged at elevated temperature, 60° C. for 200 hours.

TABLE 4A

Initial Reading

| Date | ID | pH | Viscosity | Particle size | Variant |
|---|---|---|---|---|---|
| Feb. 11, 2009 | Dispersion L-I | 4.2 | 707.0 cP | 126.0 nm | As is |
| Feb. 11, 2009 | Dispersion L-II | 4.21 | 130.8 cP | 115.8 nm | Amine added first |
| Feb. 11, 2009 | Dispersion L-III | 4.14 | 161.1 cP | 118.1 nm | Amine diluted >90% |
| Feb. 11, 2009 | Dispersion L-IV | 4.56 | 557.9 cP | 122.0 nm | wait 20 min after predispersion made |

TABLE 4A-continued

Initial Reading

| Date | ID | pH | Viscosity | Particle size | Variant |
|---|---|---|---|---|---|
| Feb. 11, 2009 | Dispersion - instant disclosure - DAB ctrl | 4.69 | 88.2 cP | 145.3 nm | 100% of total binder added in initial step. Regular DAB process |
| Feb. 11, 2009 | Dispersion - instant disclosure - Pseudo DAB-L | 4.43 | 60.6 cP | 129.7 nm | 20% of total binder added in initial step, partial DAB |

Viscosity continues to rise drastically on Dispersion L-I and IV.

TABLE 4B

After 200 hrs Aging at 60° C. oven:

| Date | ID | pH | Viscosity | Particle size | Variant |
|---|---|---|---|---|---|
| Feb. 20, 2009 | Dispersion L-I | 3.32 | 2561.0 cP | 143.2 nm | As is |
| Feb. 20, 2009 | Dispersion L-II | 3.4 | 186.9 cP | 119.5 nm | Amine added first |
| Feb. 20, 2009 | Dispersion L-III | 3.5 | 170.7 cP | 115.5 nm | Amine diluted to 90% |
| Feb. 20, 2009 | Dispersion L-IV | 3.46 | 2693.0 cP | 138.5 nm | wait 20 min after predispersion made |
| Feb. 20, 2009 | Dispersion - instant disclosure - DAB ctrl | 3.69 | 81.0 cP | 136.6 nm | Regular DAB process |
| Feb. 20, 2009 | Dispersion - instant disclosure Pseudo DAB-L | 3.59 | 62.4 cP | 129.3 nm | 5 parts of binder, partial DAB |

The viscosity increased drastically using the conventional process after 200 hours of aging (see, in particular, L-I and L-IV). Such a rise was not exhibited with the coatings formed via the method disclosed herein. Furthermore, the dispersions of the conventional process tended to be very unstable, and the viscosity continued to rise over time, which makes such dispersions virtually impossible to use in a coating process.

The embodiments disclosed herein relate to a pigment dispersion, a unique process for forming the pigment dispersion, a product (coated substrates, such as paper substrates) including a coating 220 formed from the pigment dispersion, and a system including a single mixing vessel 310 for forming the pigment dispersion.

While several embodiments have been described in detail, it will be apparent to those skilled in the art that the disclosed embodiments may be modified. Therefore, the foregoing description is to be considered exemplary rather than limiting.

What is claimed is:

1. A method of making a dispersion of polymer binder-encapsulated silica pigments for coating an ink-jet recording substrate, comprising:
    mixing first components of the dispersion to form a mixture, the first components including binder polymer; treating agents selected from the group consisting of aluminum chlorohydrate, amino silane, alkoxy silane compounds, and combinations thereof; and a vehicle selected from the group consisting of water, water-miscible organic solvent, and combinations thereof;
    shear mixing silica pigment into the mixture; and
    after the silica pigment is added to the mixture, shear mixing the mixture at a higher temperature and an increased grinding rate compared to a temperature and grinding rate of the shear mixing of the silica pigment into the mixture.

2. The method of claim 1 wherein the binder polymer is either in pellet form, in a premixed solution of the binder polymer and the vehicle, or a combination thereof.

3. The method of claim 1 wherein the first components are mixed at a grinding rate ranging from 10 Hz to 60 Hz and at a temperature ranging from 20° C. to 40° C.

4. The method of claim 1 wherein the first components are mixed at a grinding rate ranging from 10 Hz to 20 Hz and at a temperature ranging from 35° C. to 40° C.

5. The method of claim 1 wherein the silica pigment is shear mixed into the mixture at a grinding rate ranging from 20 Hz to 60 Hz and at a temperature ranging from 20° C. to 40° C.

6. The method of claim 1 wherein prior to mixing the first components, the method further comprises adding the binder polymer to a mixing vessel prior to adding the treating agents.

7. The method of claim 1 wherein after the silica pigment is added, the mixture is shear mixed at a grinding rate ranging from 20 Hz to 60 Hz and at a temperature from 30° C. to 90° C.

8. The method of claim 1 wherein the mixing and shear mixing steps are accomplished in a single mixing vessel.

9. The method of claim 1 wherein a viscosity of the dispersion increases no more than 2 cP or decreases after 200 hours in a 60° C. oven.

10. A method of forming a coated, inkjet medium, the method comprising:
    applying the dispersion of polymer binder-encapsulated silica pigments formed from the method of claim 1 to at least one side of the substrate to form a coating layer; and
    drying the coating layer;
    wherein prior to drying the coating layer, the method further comprises simultaneously applying a top coat of another pigment particle dispersion with the coating layer, the other pigment particle dispersion including binder polymer, water, and alumina pigment.

11. A coated medium made according to the method of claim 10.

12. The coated medium of claim 11 wherein a zeta potential of the dispersion of polymer binder-encapsulated silica pigments making up the coating layer ranges from about 25 to about 34.

13. The coated medium of claim 11 wherein an average particle diameter of the silica pigments in the dispersion of polymer binder-encapsulated silica pigments making up the coating layer ranges from about 120 nm to about 140 nm.

14. The coated medium of claim 11 wherein a dried dispersion of the polymer binder-encapsulated silica particles has substantially evenly distributed positive charges on respective surfaces thereof, and the coating layer exhibits an average zeta potential ranging from about 25 to about 34.

* * * * *